United States Patent Office 3,001,959
Patented Sept. 26, 1961

3,001,959
COATING COMPOSITIONS
Adolph Heck, Skokie, Ill., assignor, by mesne assignments, to Reichhold Chemicals, Inc., White Plains, N.Y., a corporation of Delaware
No Drawing. Filed Dec. 6, 1957, Ser. No. 700,986
9 Claims. (Cl. 260—18)

The present invention relates to improved epoxy ester resins, and more particularly to epoxy resin esters of unsaturated fatty acids.

Epoxy resin esters of fatty acids are known at the present time as the base for certain types of coating compositions. They are produced through esterification of pp-dihydroxy diphenyl propane-glycidyl ethers and their resinous polymers with fatty acids of drying and semi-drying oils. Other film forming materials such as rosin, tall oil, mono and dibasic aromatic acids or their anhydrides, as well as aliphatic mono and dibasic acids may also be incorporated to meet specific requirements of the coatings formulator. By the term epoxy resin, I refer to the resinous di glycidyl ether of a phenol.

The following examples illustrate the present status of the oil modified epoxy ester resin coating compositions. The information is taken from a bulletin published by the Shell Chemical Corporation, and is entitled: "Epon Resin Esters for Surface Coatings." ("Epon" being a trade name under which Shell Chemical Corporation is marketing epoxy resins.)

A great number of epoxy resins is available ranging from liquids to hard resins. The most suitable materials for esterification can be described by the following characteristics or physical properties:

Melting range from 45–150° C.—Durran mercury method
Epoxide equivalent 450–4000.—Epoxide equivalent means grams of resin containing one gram equivalent of epoxide.
Equivalent weight 115–200—means grams of resin required to esterify one gram mol of monobasic acid.

The following table demonstrates the composition and properties of a number of epoxy resin fatty acid esters which are used in the protective coatings industry:

TABLE A

| Resin composition | Linseed | Soya | Dehydrated castor oil | Linseed | Soya | Dehydrated castor oil | Linseed | Soya | Dehydrated castor oil |
|---|---|---|---|---|---|---|---|---|---|
| Oil type: | | | | | | | | | |
| Epoxy resin, percent | 60.7 | 60.5 | 60.0 | 55.4 | 55.2 | 55.4 | 50.8 | 50.7 | 50.7 |
| Oil—Fatty acid, percent | 39.3 | 39.5 | 40.0 | 44.6 | 44.8 | 44.6 | 49.2 | 49.3 | 49.3 |
| Solutions: | | | | | | | | | |
| Solvent | (1) | (1) | (1) | (1) | (2) | (1) | (3) | (3) | (2) |
| Solids percent by weight | 50 | 50 | 50 | 50 | 50 | 50 | 50 | 50 | 50 |
| Acid value | 1–3 | 1–3 | 0–2 | 3–5 | 3–5 | 3–6 | 3–5 | 3–5 | 6–9 |
| Color | 5–7 | 5–7 | 5–7 | 5–7 | 5–7 | 5–7 | 5–7 | 5–7 | 5–7 |
| Viscosity | I–L | F–I | S–V | D–G | L–N | S–U | T–W | P–R | V–Y |
| Sward hardness 4 days | 14 | 16 | 36 | 13 | 10 | 28 | 20 | 10 | 18 |
| Sward hardness 7 days | 35 | 18 | 39 | 30 | 13 | 32 | 27 | 12 | 26 |
| Dry tack free, hours | 5 | 12 | 5 | 5 | 15 | 5 | 12 | 47 | 10 |

[1] Xylene.  [2] High solvency naphtha.  [3] Mineral spirits.

NOTE:
All the resin solutions contained 0.04% cobalt metal based on vehicle solids.
Acid value is evaluated on the solid resin.
Color is compared with Gardner 1933 color standard.
Viscosity is determined at 77° F. compared with the Gardner-Holdt viscosity standard.
Film thickness 1.0 mil=0.025 mm.

The data shown in Table A makes apparent the following facts:

Dehydrated castor oil fatty acid epoxy resin esters containing from 55–60% resin have good air drying properties. The resin containing 50.70% epoxy resin dries too slow for normal drying purposes.

The viscosity of the resin solutions at 50% solids appears to be within a practical range. Resin solutions are not used however at 50% solids for most technical purposes, and resin concentrations at 35% or lower are usually required. It appears probable, and it is known from practical experience, that the reduced viscosity is too low in many cases for practical uses. In addition, when dehydrated castor oil-epoxy esters are used as primers the adhesion to metal substrates is below desired values. Linseed oil fatty acid esters have good air drying properties, when resins of 55–60% epoxy resin content are used. The composition containing 50.8% epoxy resin is however too slow air drying for most practical applications and the viscosity even at 50% is low.

All the soybean oil fatty acid epoxide esters are too slow and too low in viscosities. The film hardness is too low for practical applications.

It is apparent from the above that while epoxy resin esters are technically advantageous in some respects, there are many phases where the epoxy ester composition and properties seriously limit their practical application utility.

It is also apparent that tall oil fatty acids of low rosin content do not form a part of the above table. This is because such esters do not exhibit acceptable drying characteristics, and because heretofore tall oil fatty esters of epoxy resins have been found too greatly lacking in water resistance and too low in viscosity that the products so manufactured were of no or very limited commercial, practical utility.

It is an objective of the present invention to produce epoxy resin tall oil esters of great commercial advantage and a higher degree of technical utility as is pointed out in detail in the examples which follow, particularly examples four to seven.

It is further the object of this invention to produce resinous epoxide coating compositions which have the following advantages over the epoxy ester systems as heretofore used:

(1) Improved air drying properties (allowing the use of low rosin content tall oil fatty acids).
(2) Faster heat curing cycles.
(3) Improved adhesion to metallic substrates.
(4) Higher viscosities of the resin solutions.
(5) Improved water resistance of the films.
(6) Resistance to gas fouling and wrinkling.

It is known that aluminum alcoholates especially in a stabilized form can be utilized to improve the drying properties of certain drying oils and oil modified phthalate alkyd resins, as well as their chemical resistance, adhesion to all kinds of surfaces, and general film properties. It is also possible to improve the properties of certain oleoresinous varnishes in the same manner. Aluminum alcoholates have not been used in conjunction with epoxy esters however, because of objectionable jell formation which occurs on blending the epoxy ester with the aluminum alcoholate.

It has now been found possible to incorporate aluminum metal alcoholates as such, and in their stabilized form, into epoxide fatty acid ester compositions and thereby upgrade the properties of said solutions as mentioned above. I have observed the formation of gel particles formed as soon as the metal alcoholate was added to the epoxide ester. Even after the alcoholate was diluted with large quantities of xylene or mineral spirits gels were readily formed.

However, I unexpectedly observed that these gel particles or lumps were peptized and gradually and completely dissolved into the coating composition on prolonged agitation. Agitation causes the solution of the formed gel particles and requires usually from several hours to several days to obtain a perfectly clear and stable solution.

I have found that as much as 0.3% aluminum, calculated as metal, could be incorporated into the epoxy fatty acid ester. It is possible, in addition, to incorporate larger amounts up to 1.0% if aging or agitation is continued for a long enough time to achieve complete solution. The nature of the aluminum alcoholate and the nature of the stabilizing agent and their proportions to each other also play an important role in this instance. Such stabilized aluminum alcoholate epoxy ester products are stable over long periods without the subsequent development of jells.

Within the sense of the present inventions, the following aluminum alcoholates can be used: Aluminum isopropylate, aluminum butylate, aluminum amylate as well as the aluminum derivatives of the isomers of these aliphatic alcohols, and such longer chains containing as many as 18 carbon atoms. The aluminum phenolates as such and these carrying substituents in the benzene ring especially in a para position can also be utilized. In general, it is preferred to use the aluminum alcoholates in a stabilized or chelated form. As stabilizing or chelating agents I may employ ethylacetocetate, esters of malonic acid, formylacetone, and other compounds of tautomeric reactivity. Usable alcoholates are those of polyvalent metals, such as cobalt, manganese, copper, lithium, zinc, iron, aluminum, titanium, and tin. Metal alcoholates in form of their alkoxo-salts may be also used, as for instance copper aluminum butylate, cobalt aluminum butylate, and manganese aluminum butylate. These salts are used in the same manner as the plain alcoholates.

The epoxy resins used in the present invention refers to epoxy resins prepared from diphenylolpropane and epichlorohydrin, epoxy resins prepared from diphenylolpropane and 1,3 dichlorohydrin and the combination of such resinous products with other resinous phenylglycidyl ethers, such as cresolglycidylether, butylglycidylether, octylglycidylether having the aliphatic group in para position in the benzene ring. The glycidylethers of dihydric phenols such as resorcinol may also be used and are contemplated as part of the present specification. Incorporation of the aluminum containing compound into the epoxy-ester may take place at room temperature or elevated temperature.

It is also an objective of this invention to produce Chinawood oil fatty acid esters of epoxy resins and Licanic acid esters of epoxy resins preferably in combination with other fatty acids, such esters having the unusual characteristic of non-fouling and non-wrinkling. It is intended that China-wood oil acids and Licanic acid be used in conjunction with other fatty acids pointed out within this specification. In the following examples Epon resin No. 1004 has been employed, sold by Shell Chemical Corporation of San Francisco, California. This resin is the diglycidyl ether of bisphenol A having an epoxy equivalent of 0.11 to 0.12, a melting point of about 100° C., about .34 equivalents in active hydrogen groups per 100 grams of resin, and about .74 esterification value per 100 grams of resin.

In order to illustrate the practice of this invention and without limiting the scope thereof in any way, the following examples are appended.

*Example 1*

Epoxy resin esters were prepared from soyabean oil fatty acids and epon resin as follows (viscosity measured according to Gardner-Holdt 1933 standards):

| Number | Epon resin No. 1004 | Soya oil fatty acids | Process temp., ° F. | Solvent | Percent solids | Final visc. | Acid value |
|---|---|---|---|---|---|---|---|
| C-7-344 | 60.5 | 39.5 | 450 | Xylol | 50 | J-K | 3.8 |
| C-7-345 | 55.2 | 44.8 | 450 | Solvesso 150 | 50 | Q-R | 4.0 |
| C-7-346 | 50.7 | 49.3 | 450 | Mineral spirits. | 50 | W | 5.0 |

This example points out the products obtainable by normal methods not encompassed as part of the present invention. Processing consisted of heating all ingredients under agitation to a temperature of 450° F. and maintaining a temperature of 450° F. until no decrease of acid value occurred. A blanket of inert gas during the entire heating process.

*Example 2*

To the epoxy esters prepared as above, aluminum isopropylate chelated with ethyl acetoacetate was added in the proportion of 0.5 part of solids of aluminum chelate to 100 parts of epoxy resin solids. The addition was slowly made to the epoxy resin solution while rapid agitation was continued. It was observed that the jell which at first formed on continued agitation at room temperature completely disintegrated; the final viscosities were as follows:

| Number | Epon 1004 | Soya oil acids | Viscosity without aluminum chelate | Viscosity with aluminum chelate |
|---|---|---|---|---|
| C-7-344 | 60.5 | 39.5 | J-K | W-X. |
| C-7-345 | 55.2 | 44.8 | Q-R | Y. |
| C-7-346 | 50.7 | 49.3 | W | $Z_1$-$Z_4$. |

It is apparent from this example that the aluminum isopropylate chelate produced a remarkable increase in viscosity.

*Example 3*

The coating materials produced from C-7-344 of Example 2 were applied to a glass plate so as to produce a film when air dried exactly 1 mil in thickness. The hardness (referred to glass) was determined periodically with results observed as follows:

| Number | Hardness observation days after application | Hardness without aluminum addition, percent | Hardness with aluminum addition as in Example 2, percent |
|---|---|---|---|
| C-7-344 | 3 | 15 | 15 |
| C-7-344 | 6 | 32 | 43 |

The films were allowed to air dry on the glass plates 23 days. The plates carrying the films were then submerged in distilled water 48 hours. After the 48 hours had elapsed, the plates were withdrawn from the water and the films compared.

The film produced from the resin containing the aluminum chelate was not effected, while the film without aluminum chelate was considerably whitened and much softer and rather fragile.

It is apparent from this example that the aluminum chelate when used with the epoxy resin soya oil acid ester produced a film having the properties of increased hardness and improved water resistance.

*Example 4*

Epoxy esters were prepared from tall oil fatty acids of low rosin content (0.5–2.0 percent rosin) and epon resin as follows:

| Number | Epon resin No. 1004 | Tall oil fatty acids | Process temp., °F. | Solvent | Percent solids | Final visc. | Final acid value |
|---|---|---|---|---|---|---|---|
| C-7-350 | 60.7 | 49.3 | 450 | Xylol | 50 | J-K | 4.5 |
| C-7-351 | 55.4 | 44.6 | 450 | ___do___ | 50 | G-H | 5.2 |
| C-7-352 | 50.8 | 49.2 | 450 | Mineral spirits. | 50 | L-M | 5.2 |

This example points out the products obtainable by normal methods not encompassed as part of the present invention. Processing procedure was the same as carried out in Example No. 1.

*Example 5*

To the tall oil epoxy esters prepared as above, aluminum isopropylate chelated with ethyl acetoacetate was added in the proportion of 0.5% solids of aluminum chelate to 100 parts of epoxy resin ester solids. The addition was slowly made while rapid agitation was continued. It was observed that a jell which at first formed, completely dissolved in the epoxy ester solution. The final viscosities were as follows:

| Number | Epon 1004 | Tall oil acids | Viscosity without aluminum chelate | Viscosity with aluminum chelate |
|---|---|---|---|---|
| C-7-351 | 60.7 | 39.3 | J-K | V-W |
| C-7-352 | 55.4 | 44.6 | G-H | R-S |
| C-7-353 | 50.8 | 49.2 | L-M | Y-Z |

*Example 6*

The coating products produced in Example 5 were applied to a glass plate so as to produce when air dried a film of exactly 1 mil dry thickness. The hardness (referred to glass) was determined after 8 days with results as follows:

| Number | Epon 1004 | Tall oil acids | Sward-hardness after 8 days without aluminum chelate, percent | Sward-hardness after 8 days with aluminum chelate, percent |
|---|---|---|---|---|
| C-7-351 | 60.7 | 39.3 | 38 | 43 |
| C-7-352 | 55.4 | 44.6 | 21 | 25 |

*Example 7*

The films on glass plates obtained as detailed in Example 6 were allowed to air dry on the glass plates 23 days. The plates carrying the films were then submerged in distilled water for 48 hours. After the 48 hours had elapsed, the plates were withdrawn from the water and the films compared. (The similar films from epoxy resins were run in a like manner and simultaneously.) Water resistance results were ranked as follows:

(1) Best, C-7-351 with aluminum chelate, 55.4% Epon, 44.6% tall oil acids
(2) Second best, C-7-352 with aluminum chelate, 50.8% Epon, 49.2% tall oil acids
(3) Third best, C-7-344 with aluminum chelate, 60.5% Epon, 39.5% soya oil acids
(4) Fourth best, C-7-344 without aluminum chelate, 60.5% Epon, 39.5% soya oil acids
(5) Fifth best, C-7-351 without aluminum chelate, 55.4% Epon, 44.6% tall oil acids
(6) Sixth best, C-7-352 without aluminum chelate, 50.8% Epon, 49.2% tall oil acids It is quite remarkable and unexpected that the tall oil acid epon esters when used with aluminum isopropylate chelate produced films of greater water resistance than the soya oil epon esters. Such tall oil esters are well within the acceptable range of commercial utility. Results in the same order were obtained from films of the above materials applied to steel and to aluminum plates.

*Example 8*

The coating materials prepared from C-7-344 of Example 2 were pigmented with titanium dioxide pigment by dispersing on a roller mill. Pigmentation was in the ratio of two parts of titanium dioxide to three parts of epoxy ester solids by weight.

The pigmented coating materials thus produced were diluted with 20% by volume of xylene and sprayed onto metal panels. The thus prepared panels were placed in a gas heated oven adjusted so as to maintain a temperature of 220–235° F.

The panels were heated 30 minutes. On withdrawing the panels from the oven it was observed that the panel based on the resin without aluminum chelate modification was badly checked and fouled and lacked a smooth even glossy appearance. In contrast the panel based on the epoxy resin carrying the aluminum chelate remained smooth and even and had a high smooth gloss. This film also developed much greater hardness and improved adhesion than did the epoxy ester which did not contain the aluminum modification.

I claim:
1. The method comprising mixing a solution of a metal compound into a solution of an ester which is diglycidyl ether of diphenylol propane esterified with acid selected from the group consisting of soybean oil fatty acids and tall oil acids, said ester having an acid number in the range from 3.8 to 5.2, said metal compound being aluminum isopropylate chelated with ethyl acetoacetate and being dissolved in a solvent compatible with the solution of said ester, the ratio of aluminum metal to ester solids being in the range from 0.3 to 1.0 part of aluminum metal per 100 parts of ester, whereby gel particles form, and agitating the resulting mass until the gel particles are dissolved.

2. The method of claim 1 in which the selected acid is soybean oil fatty acids.

3. The method of claim 1 in which the selected acid is soybean oil fatty acids, and 0.5 parts of aluminum added.

4. The method of claim 1 in which the selected acid is tall oil acids.

5. The method of claim 1 in which the selected acid is tall oil acids, and 0.5 parts of aluminum are added.

6. A liquid coating composition containing the reaction product of aluminum isopropylate chelated with ethyl acetoacetate, and ester of diglycidyl ether of diphenylol propane esterified with acid selected from the group consisting of soybean oil fatty acids and tall oil acids.

7. A homogeneous stable solution of resinous material comprising a solids content which is the reaction product of from 0.3 to 1.0 part of aluminum in the form of aluminum isopropylate chelated with ethyl acetoacetate, and ester which is diglycidyl ether of diphenylol propane esterified with acid selected from the group consisting of soybean oil fatty acids and tall oil acids.

8. A homogeneous stable solution of resinous material comprising a solids content which is the reaction product of from 0.3 to 1.0 part of aluminum in the form of aluminum isopropylate chelated with ethyl acetoacetate, and ester which is diglycidyl ether of diphenylol propane esterified with soybean oil fatty acids.

9. A homogeneous stable solution of resinous material comprising a solids content which is the reaction product of from 0.3 to 1.0 part of aluminum in the form of aluminum isopropylate chelated with ethyl acetoacetate, and ester which is diglycidyl ether of diphenylol propane esterified with tall oil acids.

References Cited in the file of this patent

UNITED STATES PATENTS

| | | |
|---|---|---|
| 2,493,486 | Greenlee | Jan. 3, 1950 |
| 2,733,222 | Beacham | Jan. 31, 1956 |
| 2,742,448 | Beacham et al. | Apr. 17, 1956 |
| 2,767,158 | Schlenker et al. | Oct. 16, 1956 |